(12) United States Patent
Hafermalz et al.

(10) Patent No.: US 11,407,441 B2
(45) Date of Patent: Aug. 9, 2022

(54) STEERING GEAR

(71) Applicant: Robert Bosch GmbH, Stuttgart (DE)

(72) Inventors: Jens-Uwe Hafermalz, Waeschenbeuren (DE); Dennis Fuechsel, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 444 days.

(21) Appl. No.: 16/618,245

(22) PCT Filed: Jun. 5, 2018

(86) PCT No.: PCT/EP2018/064682
§ 371 (c)(1),
(2) Date: Nov. 29, 2019

(87) PCT Pub. No.: WO2019/007609
PCT Pub. Date: Jan. 10, 2019

(65) Prior Publication Data
US 2021/0155280 A1    May 27, 2021

(30) Foreign Application Priority Data
Jul. 5, 2017   (DE) ...................... 10 2017 211 461.4

(51) Int. Cl.
*B62D 3/04*         (2006.01)
*F16H 57/021*       (2012.01)
(Continued)

(52) U.S. Cl.
CPC ............ *B62D 3/04* (2013.01); *F16H 57/021* (2013.01); *F16H 57/039* (2013.01); *F16H 57/12* (2013.01);
(Continued)

(58) Field of Classification Search
CPC ....... B62D 3/04; F16H 57/021; F16H 57/039; F16H 57/12; F16H 2057/02082; F16H 2057/0213; F16H 2057/127
See application file for complete search history.

(56) References Cited

U.S. PATENT DOCUMENTS

| | | | | |
|---|---|---|---|---|
| 7,748,492 B2 * | 7/2010 | Iwasa | ...................... | F16C 27/04 180/444 |
| 8,667,858 B2 * | 3/2014 | Fuechsel | .............. | B62D 5/0409 384/535 |
| 10,315,687 B2 * | 6/2019 | Fuechsel | ................. | F16H 57/12 |

FOREIGN PATENT DOCUMENTS

| | | |
|---|---|---|
| CN | 1323005 C | 6/2007 |
| CN | 100513822 C | 7/2009 |

(Continued)

OTHER PUBLICATIONS

International Search Report corresponding to PCT Application No. PCT/EP2018/064682, dated Sep. 20, 2018 (German and English language document) (5 pages).

*Primary Examiner* — Thomas C Diaz
(74) *Attorney, Agent, or Firm* — Maginot, Moore & Beck LLP

(57) ABSTRACT

A steering gear for a steering system of a motor vehicle includes a housing, a gearwheel, a pinion meshing with the gearwheel, and a pinion shaft with the pinion. The pinion shaft is mounted on one side of the pinion in a floating bearing that includes a rotary bearing that receives the pinion shaft. The rotary bearing is connected to a stop element, which is simultaneously arranged displaceably and non-rotatably within a receiving space. The pivoting mobility of the pinion shaft guided by a fixed bearing, on the other side of the pinion, is limited by a stop between the stop element and a wall of the receiving space. The stop element and the receiving space are configured such that, only in the (Continued)

event of such a stop, pivoting mobility of the pinion shaft is blocked about an axis oriented perpendicular to the pivot axis.

11 Claims, 3 Drawing Sheets

(51) Int. Cl.
*F16H 57/039* (2012.01)
*F16H 57/12* (2006.01)
*F16H 57/02* (2012.01)

(52) U.S. Cl.
CPC ............... *F16H 2057/0213* (2013.01); *F16H 2057/02082* (2013.01); *F16H 2057/127* (2013.01)

(56) References Cited

FOREIGN PATENT DOCUMENTS

| | | |
|---|---|---|
| CN | 103269940 A | 8/2013 |
| CN | 105164000 A | 12/2015 |
| DE | 10 2008 002 769 A1 | 8/2009 |
| DE | 10 2008 042 477 A1 | 4/2010 |
| DE | 10 2009 054 655 A1 | 6/2011 |
| DE | 10 2014 107 073 A1 | 11/2015 |
| KR | 10-0755909 B1 | 9/2007 |
| WO | 2015/176866 A1 | 11/2015 |

\* cited by examiner

STEERING GEAR

This application is a 35 U.S.C. § 371 National Stage Application of PCT/EP2018/064682, filed on Jun. 5, 2018, which claims the benefit of priority to Serial No. DE 10 2017 211 461.4, filed on Jul. 5, 2017 in Germany, the disclosures of which are incorporated herein by reference in their entirety.

BACKGROUND

The disclosure relates to a steering gear for a steering system, in particular for a power-assisted steering system, of a motor vehicle.

In most motor vehicles, the power-assisted steering systems that are installed produce an auxiliary torque during steering and thereby reduce the steering torque that has to be applied to the steering column by the driver.

The known power-assisted steering systems are based on a steering gear which converts the driving power of a hydraulic or electric steering motor and transfers it to the steering column, for example. Steering gears of this kind are generally in the form of a rolling-contact screw mechanism and, in particular, as a crossed helical gear mechanism or worm gear mechanism. These comprise a gearwheel, which is connected directly or indirectly to the steering column, and a pinion, which meshes with said gearwheel and is driven by a steering motor via a shaft.

Backlash in the mechanism, which arises owing to component tolerances, differential thermal expansion of the gear elements, owing to wear and/or owing to setting of the material in the case of gearwheels made of plastic, is found to be problematic in steering gears of this kind. Particularly in the case of "alternate steering", i.e. in the case of directly successive steering with an alternate direction of steering lock, such backlash in the mechanism produces unwanted noise resulting from the alternate contact between opposite flanks of the teeth of the pinion and the gearwheel.

One known way of eliminating this backlash in the mechanism is for the pinion shaft to be mounted so as to be pivotable about an axis which is perpendicular to the longitudinal axis of the pinion shaft and at a distance from the meshing engagement of the pinion and a gearwheel and to be pressed against the gearwheel by means of one or more spring elements. In this arrangement, the pivotability of the pinion shaft is generally integrated into one of the two bearing assemblies by means of which the pinion shaft is supported at the ends. This bearing assembly is referred to as a "fixed bearing". The bearing assembly is then embodied with a defined mobility in the region of the other end ("floating bearing") in order to allow the deflection caused by the pivoting movement. It is possible, in particular, for the fixed bearing to be provided on the drive side, while the floating bearing is provided at the free end of the pinion shaft. In this arrangement, the spring element or elements for pressing the pinion against the gearwheel can be integrated both into the floating bearing and into the fixed bearing.

A steering gear of this kind, in which the spring force for the spring loading is produced by means of the fixed bearing, is known from DE 10 2009 054 655 A1, for example. In this steering gear, provision is made to mount the rolling bearing, which receives the pinion shaft in the region of the fixed bearing, in a pivoting sleeve on the outside. The pivoting sleeve comprises a bearing sleeve which receives the rolling bearing substantially without play, and an outer ring, which is held substantially without play in a receptacle of a housing of the steering gear, wherein the outer ring and the bearing sleeve are connected by a plurality of torsion webs, which are subject to torsion when the outer ring is rotated relative to the bearing sleeve. After the assembly of the steering gear, the torsion webs are twisted in such a way that the elastic restoring effect thereby produced brings about the spring loading of the pinion haft.

A steering gear of this kind, in which the spring force for the spring loading is, in contrast, applied in the region of the floating bearing, is known from DE 10 2008 002 769 A1, for example.

A defined minimum, the "basic play", for the pivotability of the pinion shaft about the pivot guided by the fixed bearing must be provided in order to allow deflection of the pinion shaft owing to temperature-induced expansion, owing to changes in geometry of steering gear elements formed from plastics, in particular of the gearwheel and/or the pinion shaft, owing to water absorption and owing to deviations in the concentricity of running of the gearwheel and/or of the pinion shaft. At the same time, the basic play must be limited since, when a driving power is being transferred from a steering motor to the gearwheel by means of the pinion shaft, the spring-loaded pinion shaft is pivoted in the direction of increasing distance from the gearwheel owing to the gearing forces until a stop for this pivoting movement, which can be formed, in particular, by the floating bearing of the steering gear, is reached.

When the pinion is embodied as a screw pinion and a driving power is transferred from a steering motor, via the (screw) pinion shaft to the gearwheel, the screw pinion shaft is not only pivoted about the actual pivot of the fixed bearing but also (to a small extent) about a second axis perpendicular to said pivot owing to the gearing forces, this being attributable to play or elastic deformability in the bearing assembly (especially in the fixed bearing) of the screw pinion shaft. A resulting transverse movement of the pinion shaft in the region of the floating bearing may be unwanted for various reasons.

It is the underlying object of the disclosure, for a steering gear of the kind known from DE 10 2009 054 655 A1 for example, to specify a floating bearing by means of which, on the one hand, the basic play is limited and, on the other hand, a transverse movement is as far as possible prevented with a design embodiment which is as simple as possible.

This object is achieved by means of a steering gear according to the disclosure. Advantageous embodiments of the steering gear according to the disclosure form the subject matter of the dependent patent claims and/or will become apparent from the following description of the disclosure.

According to the disclosure, a steering gear for a steering system of a motor vehicle is provided which has a housing, a gearwheel, a pinion, in particular screw pinion, meshing with the gearwheel, and a (screw) pinion shaft comprising the pinion.

On one side of the pinion, the pinion shaft is mounted in a fixed bearing, by means of which the pinion shaft is mounted within the housing in such a way as to be pivotable about a pivot mounted transversely (and, in particular, perpendicularly) to the longitudinal axis of the pinion shaft, wherein the pivot is oriented in such a way that pivoting leads to a change in the distance between the axes of rotation of the gearwheel and the pinion. This fixed bearing can preferably comprise a rotary bearing, in which the pinion shaft is received. For this purpose, the rotary bearing can comprise at least one inner bearing ring and one outer bearing ring, and possibly, in the case of a preferred embodiment as a rolling and, in particular, ball bearing, a plurality of rolling elements, in particular balls, arranged between the bearing rings, wherein the pinion shaft is received within the inner bearing ring of the rotary bearing. The rotary bearing and, in particular, the outer bearing ring of the rotary bearing of the fixed bearing can furthermore be received in a bearing sleeve. Moreover, the fixed bearing can comprise a pivot ring, which has an outer ring and an inner ring, which are connected pivotably to one another by one or more torsion webs, wherein the inner ring is connected to the bearing sleeve or is integrated therein, and the outer ring is arranged fixed in the housing of the steering gear (in respect of at least one, preferably in respect of all, directions, i.e. being immobile).

On the other side of the pinion, the pinion shaft of a steering system according to the disclosure is furthermore mounted in a floating bearing that comprises a rotary bearing, in which the pinion shaft is received, wherein for the rotary bearing (and thus also for the pinion shaft end received therein), radial mobility within the housing is ensured in respect of the pivoting mobility (about the defined pivot) of the pinion shaft guided by the fixed bearing. The rotary bearing of the floating bearing of the steering gear according to the disclosure can comprise at least one inner bearing ring and one outer bearing ring, and possibly, in the case of a preferred embodiment as a rolling and, in particular, ball bearing, a plurality of rolling elements, in particular balls, arranged between the bearing rings, wherein the pinion shaft is received within the inner bearing ring.

For a steering gear according to the disclosure, it is furthermore envisaged that the pinion is pushed against the gearwheel by means of a preloaded spring element in such a way that pivoting of the pinion shaft about the pivot guided by the fixed bearing, which leads to an increasing distance between the axes of rotation of the gearwheel and of the pinion, increases the preloading of the spring element. In this case, it is possible, in particular, for the spring element to be formed by the fixed bearing itself, e.g. by the already described embodiment with a pivot ring having one or more torsion webs.

According to the disclosure, a steering system of this kind is characterized in that the rotary bearing, in particular an outer bearing ring of the rotary bearing, of the floating bearing is connected directly or indirectly to a stop element, which is arranged in such a way that it can be moved in translation and is simultaneously secured against rotation within a receiving space (in particular a receiving space formed directly by the housing), wherein the pivoting mobility (and therefore the basic play described) of the pinion shaft guided by the fixed bearing is limited by stop contact between the stop element and a wall of the receiving space. It is furthermore envisaged that the stop element and the receiving space are designed in such a way that, only when such a stop is formed, as a result of the interaction of the then contacting contact surfaces of the stop element and the wall of the receiving space, pivoting mobility of the pinion shaft about an axis oriented perpendicularly to the pivot defined by the fixed bearing is additionally blocked.

The stop element can preferably be in the form of an annular stop sleeve in which the rotary bearing of the floating bearing, in particular an outer bearing ring thereof, is received.

The disclosure is based on the realization that, when transferring a relevantly high driving power, the pinion shaft is always pivoted about the pivot defined by the fixed bearing owing to the gearing forces, until the stop is reached. Accordingly, it may be sufficient to arrange for an unwanted transverse movement of the pinion shaft in the region of the floating bearing, likewise resulting from the gearing forces, to be blocked structurally only when the pinion shaft has in fact been pivoted until it reaches the stop. This can be achieved in a manner which is simple in terms of design by suitable shaping of the contact surfaces formed, on the one hand, by the stop sleeve and, on the other hand, by the wall of the receiving space. In this case, it should be taken into account that, despite this interaction between the contact surfaces to prevent or block a transverse movement of the stop sleeve and hence of the pinion shaft (when there is stop contact), it is ensured that the pinion shaft can spring back and thus move back out of stop contact as soon as the driving power applied to the pinion shaft has been sufficiently reduced or has disappeared.

According to the disclosure, the term "contact surface" should be interpreted as also including very small, linear or punctiform contact surfaces, e.g. if the stop element or the wall of the receiving space forms a contact or stop edge.

To achieve the function according to the disclosure, a steering gear according to the disclosure and, more specifically, the contact surfaces of the stop element and of the wall of the receiving space can be designed in a large number of different embodiments.

Such a function can be implemented in a manner that is advantageous in terms of design if the contact surface of the stop sleeve and/or the contact surface of the wall of the receiving space are/is of curved and/or angled design (preferably with a vertex line extending parallel to the longitudinal axis of the pinion shaft). It is thereby possible to ensure that, when the stop is formed between the stop element and the wall of the receiving space, the stop element and the pinion shaft connected thereto via the rotary bearing adopt a "centered" position which is substantially free from transverse movement, in relation to the position which the pinion shaft adopts in the state in which it is not subject to any driving power, with the result that, in relation to these two end positions for the pinion shaft, the pivoting movement, of the pinion shaft is limited exclusively to pivoting about the pivot defined by the fixed bearing.

Provision can preferably be made for both the contact surface of the stop element and the contact surface of the wall of the receiving space to be of curved and/or angled design, thereby making it possible to achieve contact over as large as possible an area when the stop is formed.

As a particular preference, provision can be made for the contact surfaces of the stop element and of the wall of the receiving space to be designed in such a way that they are curved or angled in the same way. This is interpreted to mean that, in the case of a curvature, the orientation of the curvature and the radius of curvature in respectively adjoining contact regions are the same or of the same magnitude. The same applies to an angle formed between two contact regions of the individual contact surfaces in the case of an angled embodiment. As a further preference, provision can be made, in the case of a curved embodiment of the contact surfaces, for the angle of curvature to be constant over the entire circumferential segment of the individual contact surfaces and therefore these each form a segment of a cylindrical surface, something that can have a positive effect particularly on suitability for production.

According to a particularly preferred embodiment of a steering gear according to the disclosure, provision can be made for the wall of the receiving space to be (predominantly) cylindrical, at least in the section surrounding the stop element, and for the stop element, which is preferably in the form of a stop sleeve, to have a main body in the form of a circular ring, wherein at least one projection forming their respective contact surface is provided on the wall of the receiving space and/or on the outside of the main body.

In this context, it is possible, in particular, for such a projection to be integrated in one piece and, in particular, also in a materially uniform way into the wall of the receiving space or into the main body of the stop element.

To ensure that, starting from a stop being formed between the stop element and the wall of the receiving space, the pinion shaft can pivot back under the influence of the spring element when it is no longer subject or subject only to a reduced extent to driving power, provision can preferably be made, on both sides in the circumferential direction, for the contact surface of the stop element to end ahead of that radial plane of the main body which is oriented parallel to the pivot defined by the fixed bearing. This can be relevant, particularly in the case of an embodiment of the steering gear with a cylindrical receiving space and in the case of embodiment of the stop element as a stop sleeve with a main body in the form of a circular ring, in order to guarantee sufficient mobility for the stop sleeve within the receiving space.

According to a preferred embodiment of a steering gear according to the disclosure, provision can be made for a part of the fixed bearing which is arranged in a manner fixed against relative rotation in the housing, in the case of an embodiment with a pivot ring having one or more torsion webs, in particular for the bearing sleeve and/or an outer bearing ring of the rotary bearing of the fixed bearing to be connected directly or indirectly, via a single- or multi-part connecting element, to an outer bearing ring of the rotary bearing and/or to the stop element of the floating bearing. It is thereby possible, on the one hand, to ensure that the restoring torque of the elastically twisted torsion webs of the pivot ring of the fixed bearing (insofar as said bearing is embodied accordingly) is no longer transferred to the pinion shaft exclusively via the rotary bearing of the fixed bearing in order to press said shaft against the gearwheel but, instead, that the pivoting load on the bearing sleeve of the fixed bearing resulting from the restoring torque is additionally or primarily transferred via the connecting element to the rotary bearing of the floating bearing and hence to the pinion shaft end mounted therein. In combination with contact between the pinion and the gearwheel, which takes place between the fixed bearing and the floating bearing, there is a substantially radially oriented load on the rotary bearings based on the restoring torque of the twisted torsion webs. There is therefore no transfer of a tilting moment of a relevant level, which is based on this restoring torque of the torsion webs, from the rotary bearings and, in particular, from the rotary bearing of the fixed bearing to the pinion shaft. This advantageously makes it possible to keep the dimensions of the rotary bearing of the fixed bearing and/or the rotary bearing of the floating bearing relatively small, which may have a positive effect in respect of the size and weight and in respect of the production costs of a steering gear according to the disclosure. Moreover, a rotary bearing of relatively simple configuration in respect of design, preferably a single-row radial ball bearing, can be chosen for the fixed bearing and/or the floating bearing, which may likewise have a positive effect in respect of the size and weight and in respect of the production costs of a steering gear according to the disclosure.

On the other hand, it is also advantageously possible for the connecting element to be used to bring about the rotationally secure arrangement of the stop element within the receiving space, for which purpose provision can be made for the stop element to be connected to the connecting element in a manner fixed against relative rotation.

According to a preferred embodiment of a steering gear according to the disclosure, provision can be made for the connecting element to be of at least partially tubular design. In particular, provision can be made for the connecting element to be of tubular design over its entire length and, at the same time, to surround the pinion shaft, wherein a (through) opening (preferably the only (through) opening) arranged in the region of the pinion is provided in the tube casing of the connecting element, said opening extending over part of the circumference and part of the length of the tube casing and allowing engagement of the pinion with the gearwheel. A tubular connecting element of this kind is relatively stiff in bending and torsion (especially in relation to the component weight), on the one hand allowing advantageous transfer of a pivoting load from the fixed bearing to the floating bearing and, on the other hand, allowing the desired securing of the stop element against rotation.

In an embodiment of a steering gear according to the disclosure which is advantageous particularly for reasons connected with production engineering, provision can be made for the connecting element to be formed integrally and preferably in one piece (i.e. not connected to one another via separate connecting elements), in particular also in a materially uniform way, with a preferably provided bearing sleeve of the fixed bearing and/or with the stop element of the floating bearing (i.e. for them to be connected immovably to one another, at least directly).

It is furthermore possible to provide for the rotary bearing of the floating bearing to be directly or indirectly mounted within an (end) section of the connecting element and for a (the same or some other) section of the connecting element to be directly or indirectly mounted within the stop element of the floating bearing, said stop element being designed, in particular, as a stop sleeve. This can lead, in particular, to relatively good ease of assembly of such a steering gear according to the disclosure.

The disclosure also furthermore relates to a steering system having a steering gear according to the disclosure and having a steering motor connected with a rotary driving effect to the pinion shaft of the steering gear. Here, the gearwheel of the steering gear can furthermore be connected for conjoint rotation or with a rotary driving effect to a steering shaft, in particular a steering column, of the steering system.

Such a steering system according to the disclosure can be designed, in particular, as a power-assisted steering system, in which an auxiliary torque can be produced by means of the steering motor, thus reducing (possibly also as far as zero temporarily) a steering torque that has to be applied to the steering column by a driver of a motor vehicle comprising the power-assisted steering system in order to steer the motor vehicle. As an alternative, there is also the possibility of designing the steering system in such a way that the entire steering torque required for steering (in particular for a "steer-by-wire" functionality of the steering system or of the motor vehicle, in which there is no mechanical connection between a manual steering device (if still provided at all) and the steerable wheels) is (always) produced by the steering motor.

The disclosure also relates to a motor vehicle having a steering system according to the disclosure.

The indefinite article ("a", "an"), in particular in the patent claims and in the description providing a general explanation of the patent claims, are to be interpreted as such and not as numerals. Components correspondingly specified thereby should therefore be interpreted as being present at least in a single instance and possibly in multiple instances.

BRIEF DESCRIPTION OF DRAWINGS

The disclosure is explained in greater detail below by means of an illustrative embodiment illustrated in the drawings. In the drawings.

DETAILED DESCRIPTION

Figure 1:
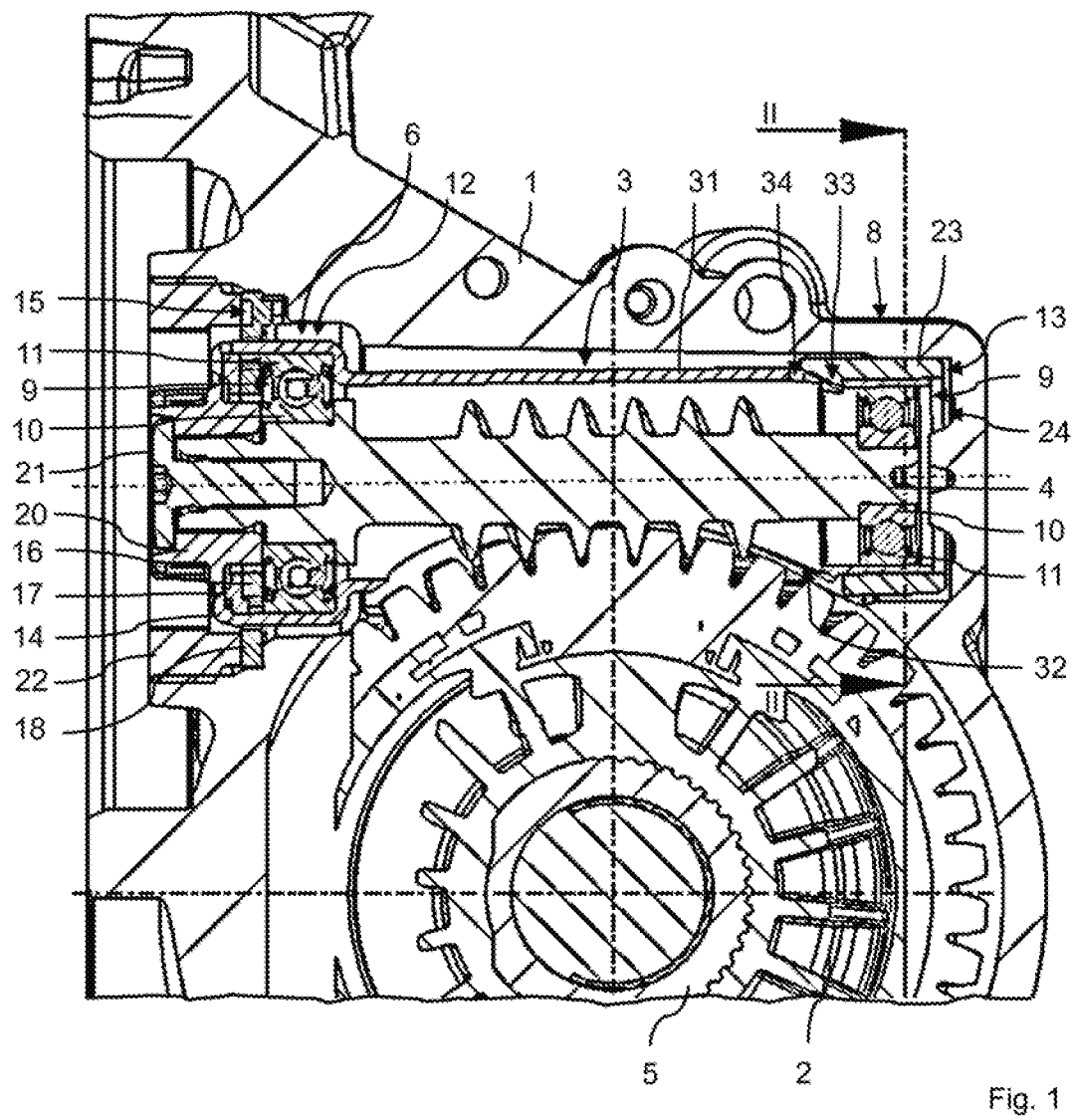
FIG. 1 shows a longitudinal section through a steering gear according to the disclosure.

FIG. 1 shows the essential components of a steering gear according to the disclosure. Said steering gear comprises a housing 1, within which a gearwheel 2 and a pinion 3 in the form of a screw pinion that meshes with the gearwheel 2 are rotatably arranged. The pinion 3 and a (screw) pinion shaft 4 comprising the pinion 3 are of integral design in the form of a worm.

The gearwheel 2 is secured firmly on an output shaft 5 of the steering gear. This output shaft 5, which has splines for secure connection to the gearwheel 2 for conjoint rotation therewith in the illustrative embodiment shown, can mesh with a steering rod designed, at least in one section, as a rack, as a result of which the rack performs a translational movement, which can be converted in a known manner, via wheel steering levers (not illustrated) into a pivoting movement of steerable wheels (not illustrated) of the motor vehicle. However, the output shaft 5 can also be a steering column of a power-assisted steering system that is connected to a steering wheel and acts via a steering pinion on the steering rod.

Figure 5:
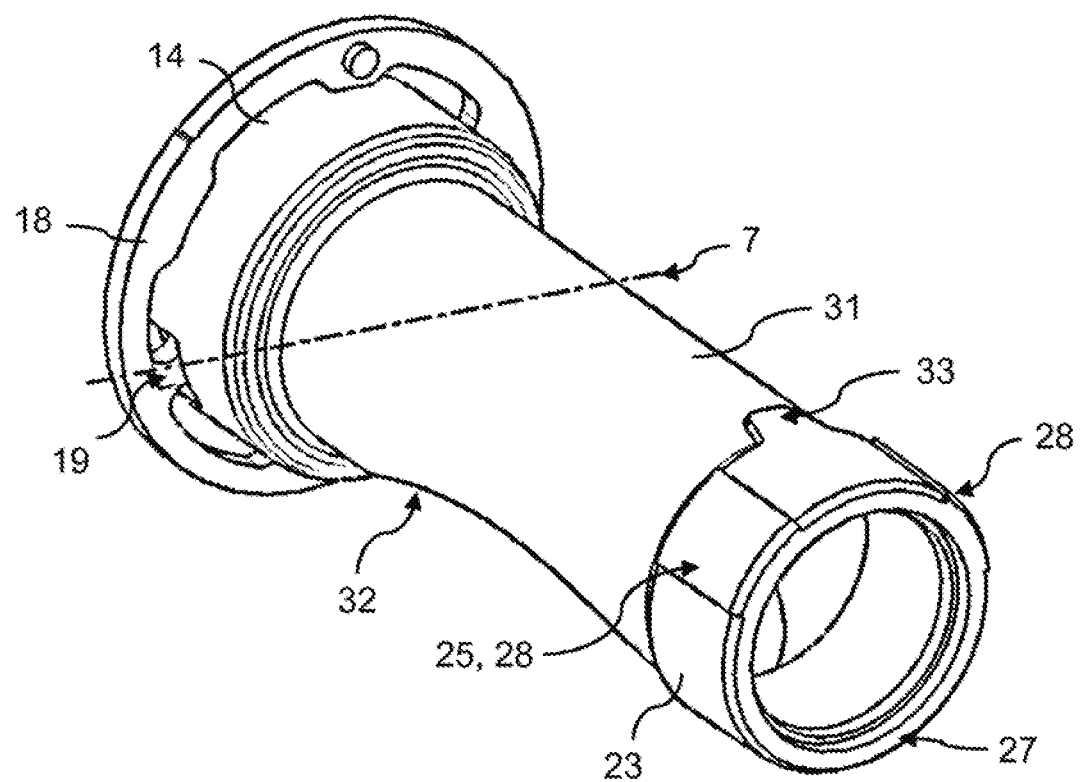
FIG. 5 shows a connecting element, a pivot ring of a fixed bearing of the steering gear, and the stop sleeve of the steering gear in a perspective view.

The pinion shaft 4 has a drive-side end, via which it can be connected to the output shaft of a steering motor (not illustrated; e.g. an electric motor). In the region of this drive-side end, the pinion shaft 4 is mounted in the housing 1 by means of a first bearing assembly. This bearing assembly is designed as a fixed bearing 6, which allows pivoting of the pinion shaft 4 about a pivot 7 (cf. FIG. 5). Here, this pivot 7 extends approximately perpendicularly to the plane of the page in FIG. 1. Such pivoting causes deflection of the opposite end of the pinion shaft 4 from the drive-side end, said opposite end being mounted there by means of a floating bearing 8 in a corresponding receptacle of the housing 1. This floating bearing 8 is designed in such a way that it allows the deflection of this end resulting from the pivoting of the pinion shaft 4.

Both the fixed bearing 6 and the floating bearing 8 comprise a respective rotary bearing in the form of a ball bearing 9. The corresponding sections of the pinion shaft 4 are mounted in the inner bearing rings 10 of these ball bearings 9, while outer bearing rings 11 of the ball bearings 9 are mounted respectively in a bearing device 12, 13, said devices being received, in turn, in the housing 1. The bearing devices 12, 13 are of a structural design such that, in the case of the fixed bearing 6 they allow the pivoting of the pinion shaft 4 about the pivot 7 and, in the case of the floating bearing 8, they allow the deflection of the free end of the pinion shaft 4.

For this purpose, the bearing device 12 of the fixed bearing 6 comprises a bearing sleeve 14 with a cross section in the form of a circular ring, said sleeve receiving the associated ball bearing 9 on the inside, in a first longitudinal section, and receiving an inner ring 16 of a pivot ring 15 in a second longitudinal section. This inner ring 16 of the pivot ring 15 is mounted in a manner fixed against relative rotation and secured axially within the bearing sleeve 14 via a supporting washer 17, wherein the inner ring 16 is supported on the outer bearing ring 11 of the ball bearing 9 of the fixed bearing 6. In addition to the inner ring 16, the pivot ring 15 furthermore comprises an outer ring 18. The outer ring 18 is connected to the inner ring 16 by two torsion webs 19 (cf. FIG. 5). The outer ring 18, the inner ring 16 and the torsion webs 19 are preferably formed in one piece, e.g. from spring steel.

The ball bearing a of the fixed bearing 6 is secured axially in position on the pinion shaft j, with the interposition of a pressure piece 20, by means of a screw 21 which is screwed into an internal thread that is integrated into the drive-side end of the pinion shaft 4. The outer ring 18 of the pivot ring 15 is secured axially in position within the housing 1 by means of a screw ring 22, which has an external thread that is screwed into a corresponding internal thread in the housing 1.

The two torsion webs 19 define the position of the pivot about which the outer ring 18 can be pivoted relative to the inner ring 16 of the pivot ring 15. Here, the torsion webs 19 of the pivot ring 15 not only allow pivoting of the outer ring 18 relative to the inner ring and hence of the pinion shaft 4 relative to the gearwheel 2 or relative to the housing 1 but, at the same time, bring about, the spring force by which the inion 3 of the pinion shaft 4 is pressed into the gearing of the gearwheel 2 in order to ensure as little as possible backlash in the mechanism and therefore low noise generation during the operation of the steering gear, especially in the case of what is referred to as alternative steering. The spring force results from the fact that, during the assembly of the steering gear, the pinion shaft 4 is deflected to such an extent owing to contact with the gearwheel 2 that a sufficient torsional preload on the torsion webs 19 is obtained, as a result of which the elastic restoring torques that result from this torsional preloading of the torsion webs 19 act counter to this deflection of the pinion shaft 4 and thus press it against the gearwheel 2.

The bearing device 13 of the floating bearing 8 comprises a stop element in the form of a stop sleeve 23, which is arranged within a receiving space 24 formed by the housing 1 with a mobility such that the pivoting mobility about the pivot 7 defined or formed by the fixed bearing 6 is possible within the limits of a structurally defined basic play. Here, this basic play or this mobility is limited in one direction by full contact or contact occurring at two respective flanks of the individual teeth of the pinion 3 and the gearwheel 2, this being brought about by the spring loading by means of the twisted torsion webs 19, and in the other direction by a stop, which is formed by contact between contact surfaces 25, 26 formed, on the one hand, by the stop sleeve 23 and, on the other hand, by the wall of the housing 1 which delimits the receiving space 24.

Figure 2:
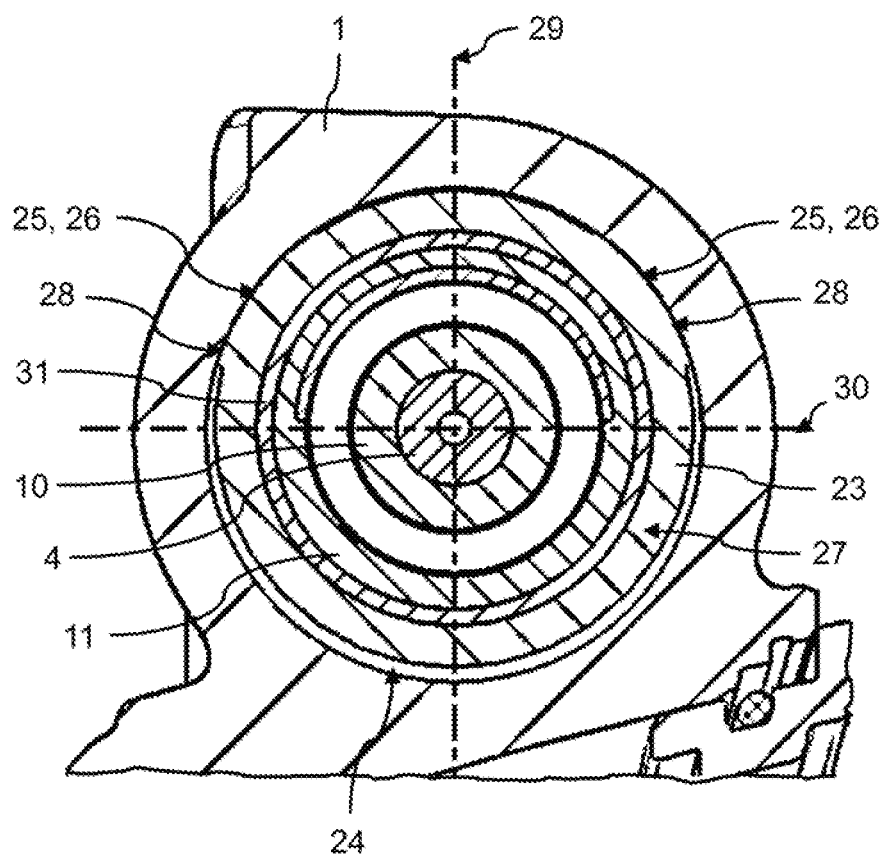
FIG. 2 shows a cross section through the steering gear along section plane II-II in FIG. 1.
Figure 3:
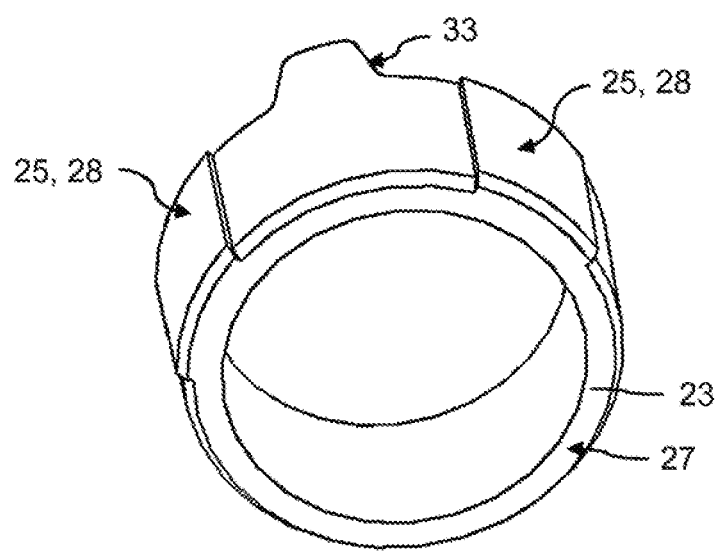
FIG. 3 shows a stop sleeve of a floating bearing of the steering gear in a perspective view.
Figure 4:
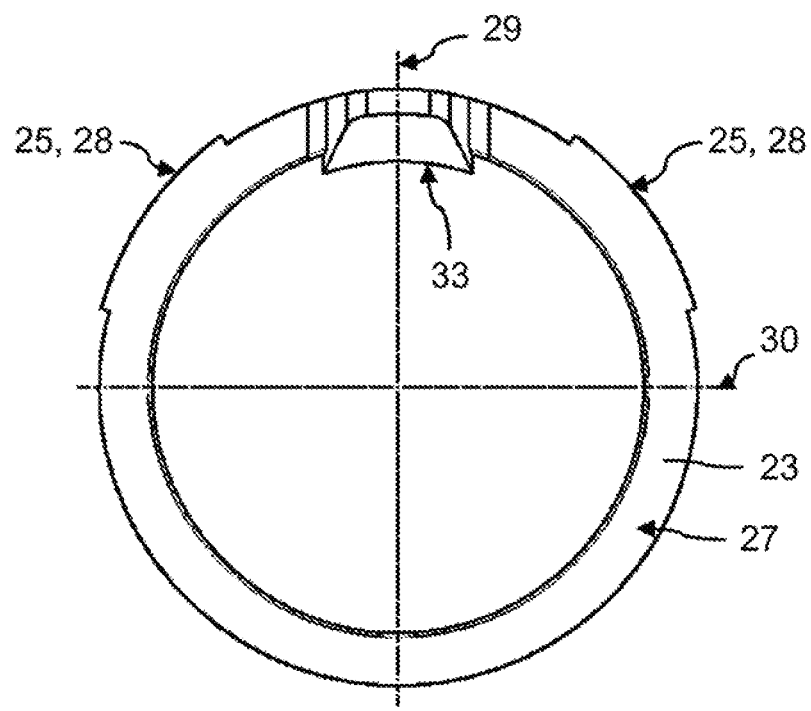
FIG. 4 shows the stop sleeve in a view from the front.

As is apparent especially from FIG. 2, the receiving space 24 is of cylindrical design and consequently has a circular aperture cross section (of constant size over the longitudinal extent). The stop sleeve 23 comprises a main body 27 in the form of a circular ring, from the outside of which there rise two projections 28, which are arranged spaced apart and the outer sides of which have outer surfaces with a partially cylindrical curvature. In combination, these outer surfaces of the projections 28 form the two-part contact surface 25 of the stop sleeve 23. Here, the radius of curvature of this contact surface of the stop sleeve 23 corresponds to the radius of curvature of the wall delimiting the receiving space 24, while the outer radius of curvature of the annular main body 27 of the stop sleeve 23 is smaller than the radius of curvature of the wall delimiting the receiving space 24. As a result, the required pivoting mobility, guided by the fixed bearing 6, for the pinion shaft 4 and the stop sleeve 23 connected thereto (in FIG. 2 in the two directions defined by the vertical radial axis 29 of the main body 27 of the stop sleeve 23 or of the pinion shaft 4) is enabled, wherein, in the case of the formation of the stop between the stop sleeve 23 and the wall of the receiving space 24, the contact surfaces 25, 26, that is to say, on the one hand, the outer sides of the projections 28 of the stop sleeve 23 and, on the other hand, the respectively adjoining sections of the wall of the receiving space 24, which form the contact surface 26 of the wall of the receiving space 24, make contact.

As soon as or as long as such a stop is formed between the stop sleeve 23 and the wall of the receiving space 24, not only is the pivoting mobility of the pinion shaft about the pivot 7 defined by the fixed bearing 6 limited but so is, in addition, a pivoting movement about an axis perpendicular to said pivot 7, which would lead to a lateral (transverse) movement of the stop sleeve 23 and of that end of the pinion shaft 4 which is received therein along a horizontal radial axis 30 of the main body of the stop sleeve 23 or of the pinion shaft 4, as shown in FIG. 2, because the stop formed is also effective in relation to such a pivoting movement by virtue of the curved configuration of the contact surfaces 25, 26 of the stop sleeve 23 and of the wall of the receiving space 24.

As is apparent from FIG. 2, the contact surface 25 of the stop element 23 ends ahead of the horizontal radial axis 30 on both sides in the circumferential direction, and thus ahead of that radial plane of the main body 27 of the stop sleeve 23 which is oriented parallel to the pivot 7 defined by the fixed bearing 6. This ensures that the pinion shaft 4 and thus also the stop sleeve 23 can pivot back through the action of the twisted torsion webs (downward in FIG. 2) without the occurrence of stop contact on a section of the wall of the receiving space 24 which is situated below this radial plane. Consequently, such pivoting back is not prevented by the configuration of the floating bearing 8 of the steering gear. On the other hand, the floating bearing 8 also does not prevent any transverse movement of the stop sleeve 23 and of the end of the pinion shaft 4 which is mounted therein as long as no stop is formed between the stop sleeve 23 and the wall of the receiving space 24. This is unproblematic since the steering gear is designed in such a way that, when a driving power of a relevant level is transferred via the pinion shaft 4, the pinion shaft 4 is always pivoted about the pivot 7 defined by the fixed bearing 6 owing to the gearing forces and, accordingly, the stop sleeve is deflected upward in FIG. 2 until such a stop is formed, in which case an unwanted transverse movement of: that end of the pinion shaft 4 which is mounted in the floating bearing 8 is also always prevented by this stop.

The steering gear furthermore comprises a connecting element 31, which is integrated into the bearing sleeve of the fixed bearing 6 (in one piece and in a materially uniform way) or is formed as an extension thereof. As is apparent from FIGS. 1 and 5, the extension element 31 is of tubular design with a cross section in the form of a (partial) circular ring, wherein said element forms a casing aperture 32 which is arranged in a central section relative to the longitudinal axis of the connecting element 31 and extends over a segment of the circumference thereof. Through this casing aperture it is possible for a section of the gearwheel 2 to project into the internal volume delimited by the connecting element 31 and receiving the pinion shaft 4 in the section forming, inter alia, the pinion 3 in order to allow engagement of the gearwheel 2 with the pinion 3.

A (tubular) end section of the connecting element 31 extends into the floating bearing 8 of the steering gear, wherein the ball bearing 9 of the floating bearing 8 is mounted within this end section of the connecting element by means of the associated outer bearing ring 11, while the end section, in turn, is mounted on the inside in the stop sleeve 23 of the floating bearing 8.

On the one hand, it is ensured by means of the connecting element 31 that the elastic restoring torques that result from the torsion of the torsion webs 19 of the pivot ring of the fixed bearing 6 are not transferred to the pinion shaft 4 exclusively via the ball bearing 9 of the fixed bearing 6, which would be associated with a relatively high tilting load on this ball bearing 9. On the contrary, these elastic restoring torques are transferred to the ball bearing 9 of the floating bearing primarily via the bearing sleeve 14 of the fixed bearing 6 and via the connecting element 36 connected integrally thereto.

On the other hand, the already mentioned securing of the stop sleeve 23 against rotation is achieved by means of the connecting element 31 since said sleeve is connected to the connecting element 31 in a manner secured against rotation and the connecting element, in turn, is integrated into the fixed bearing 6 in a manner secured against rotation. The rotationally secure connection between the connecting element 31 and the stop sleeve 23 is brought about by engagement of a retaining projection 33 on the stop sleeve 23, said projection being in the form of a latching tab, in a correspondingly positioned through opening 34 in the connecting element 31.

LIST OF REFERENCE SIGNS 1 housing
2 gearwheel
3 (screw) pinion
4 (screw) pinion shaft
5 output shaft of the steering gear
6 fixed bearing
7 pivot
8 floating bearing
9 (radial) ball bearing
10 inner bearing ring of a ball bearing
11 outer bearing ring of a ball bearing
12 bearing device of the fixed bearing
13 bearing device/bearing bush of the floating bearing
14 bearing sleeve
15 pivot ring
16 inner ring of the pivot ring
17 supporting washer
18 outer ring of the pivot ring
19 torsion web
20 pressure piece
21 screw
22 screw ring
23 stop sleeve 24 receiving space
25 contact surface of the stop sleeve
26 contact surface of the wall of the receiving space
27 main body of the stop sleeve
28 projection of the stop sleeve
29 vertical radial axis of the main body of the stop sleeve/pinion shaft
30 horizontal radial axis of the main body of the stop sleeve/pinion shaft
31 connecting element
32 casing aperture
33 retaining projection on the stop sleeve
34 through opening in the connecting element

The invention claimed is:

1. A steering gear for a steering system of a motor vehicle, having comprising:
 a housing;
 a gearwheel having an axis of rotation;
 a pinion having an axis of rotation, the pinion configured to mesh with the gearwheel;
 a pinion shaft that includes the pinion;
 a fixed bearing, on one side of the pinion, configured to mount the pinion shaft within the housing such that the pinion shaft is configured to be pivotable about a pivot mounted transversely to the longitudinal axis of the pinion shaft, the pivot oriented such that pivoting of the pinion shaft leads to a change in the distance between the axes of rotation of the gearwheel and the pinion;
 a floating bearing, on the other side of the pinion, includes a rotary bearing, the pinion shaft is configured to be mounted in the floating bearing and received in the rotary bearing, wherein for the rotary bearing, mobility within the housing is ensured in respect of the pivoting mobility of the pinion shaft guided by the fixed bearing; and
 a preloaded spring element configured to push the pinion against the gearwheel in such a way that pivoting of the pinion shaft, which leads to an increasing distance between the axes of rotation of the gearwheel and of the pinion, increases the preloading of the spring element,
 wherein the rotary bearing of the floating bearing is connected to a stop element, which is configured to be moved in translation and is simultaneously secured against rotation within a receiving space, wherein the pivoting mobility of the pinion shaft guided by the fixed bearing is limited by stop contact between the stop element and a wall of the receiving space, wherein the stop element and the receiving space are configured such that, only in the event of the stop contact, as a result of the interaction of the then contacting contact surfaces of the stop element and the wall of the receiving space, pivoting mobility of the pinion shaft about an axis oriented perpendicularly to the pivot is additionally blocked.

2. The steering gear as claimed in claim 1, wherein the stop element is configured as a stop sleeve that receives the rotary bearing of the floating bearing.

3. The steering gear as claimed in claim 1, wherein one or more of the contact surface of the stop element and the contact surface of the wall of the receiving space is one or more of curved design and of angled design.

4. The steering gear as claimed in claim 3, wherein the contact surface of the stop element and the contact surface of the wall of the receiving space are configured to be curved or angled in the same way.

5. The steering gear as claimed in claim 3, wherein the wall of the receiving space is cylindrical and the stop element has a main body configured as a circular ring.

6. The steering gear as claimed in claim 5, wherein, on both sides in the circumferential direction, the contact surface of the stop element ends ahead of a radial plane of the main body that is oriented parallel to the pivot defined by the fixed bearing.

7. The steering gear as claimed in claim 5, wherein the wall of the receiving space is cylindrical in a section surrounding the stop element.

8. The steering gear as claimed in claim 1, wherein the fixed bearing comprises a rotary bearing, in which the pinion shaft is received and which is received in a bearing sleeve, and wherein the fixed bearing further comprises a pivot ring, which has an outer ring and an inner ring, which are connected pivotably to one another by one or more torsion webs, wherein the inner ring is connected to the bearing sleeve or is integrated therein, and the outer ring is arranged fixed in the housing.

9. The steering gear as claimed in claim 8, wherein a part of the fixed bearing that is arranged in a manner fixed against relative rotation in the housing is connected via a connecting element to one or more of an outer bearing ring of the rotary bearing of the floating bearing and/or to the stop element of the floating bearing.

10. The steering gear as claimed in claim 9, wherein the stop element is connected directly or indirectly to the connecting element in a manner fixed against relative rotation.

11. The steering gear as claimed in claim 1, wherein the rotary bearing of the floating bearing is mounted within a section of a connecting element, and a section of the connecting element is mounted within the stop element of the floating bearing.

* * * * *

UNITED STATES PATENT AND TRADEMARK OFFICE
CERTIFICATE OF CORRECTION

PATENT NO. : 11,407,441 B2
APPLICATION NO. : 16/618245
DATED : August 9, 2022
INVENTOR(S) : Hafermalz et al.

It is certified that error appears in the above-identified patent and that said Letters Patent is hereby corrected as shown below:

In the Claims

In Claim 1, at Column 11, Line 16: "having comprising:" should read --comprising:--.

In Claim 9, at Column 12, Line 39: "floating bearing and/or to the stop element" should read --floating bearing and the stop element--.

Signed and Sealed this
Twenty-fourth Day of January, 2023

Katherine Kelly Vidal
*Director of the United States Patent and Trademark Office*